PRESSURE FLUID CONTROL VALVES

Filed Dec. 24, 1957 18 Sheets-Sheet 1

Inventor
Allan Gordon Roxburgh
By Karl W. Flocks
Attorney

Inventor
Allan Gordon Roxburgh
By Karl W. Flocks
Attorney

Inventor
Allan Gordon Roxburgh
By KARL W. FLOCKS
Attorney

Inventor
Allan Gordon Roxburgh
By KARL W. FLOCKS
Attorney

Inventor
Allan Gordon Roxburgh
By. Karl W. Flocks
Attorney

PRESSURE FLUID CONTROL VALVES

Filed Dec. 24, 1957 18 Sheets-Sheet 6

Inventor
Allan Gordon Roxburgh
By Karl W. Flocks
Attorney

PRESSURE FLUID CONTROL VALVES

Inventor
Allan Gordon Roxburgh
By Karl W. Flocks
Attorney

Nov. 15, 1960 A. G. ROXBURGH 2,960,073

PRESSURE FLUID CONTROL VALVES

Filed Dec. 24, 1957 18 Sheets-Sheet 8

Inventor
Allan Gordon Roxburgh

By KARL W. FLOCKS
Attorney

PRESSURE FLUID CONTROL VALVES
Filed Dec. 24, 1957
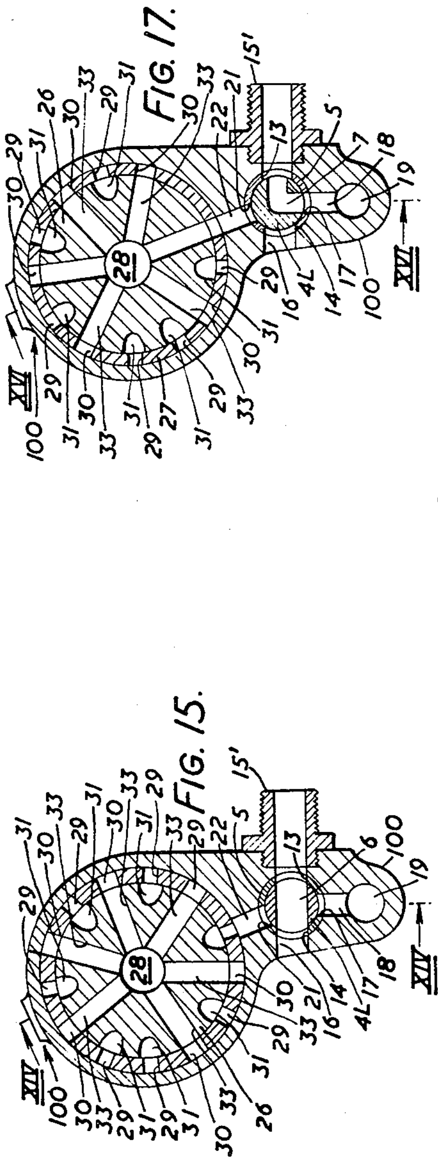
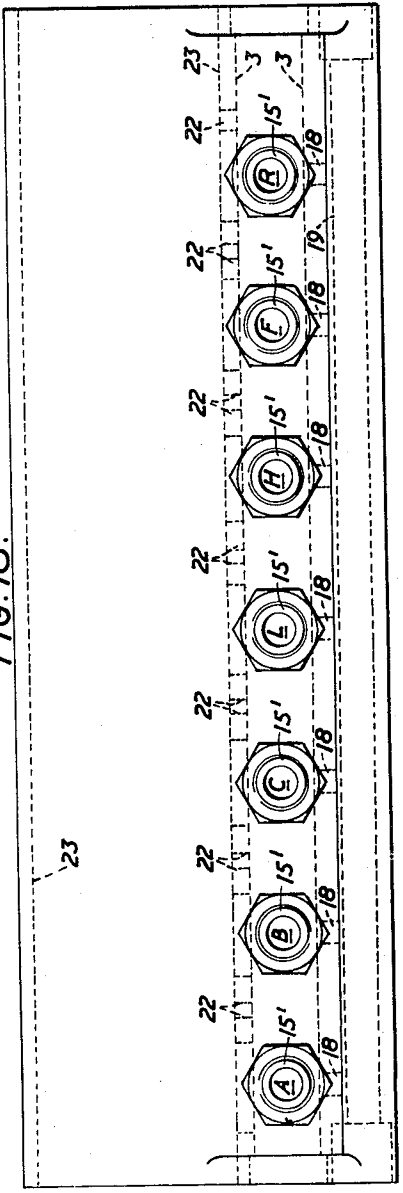
Inventor
Allan Gordon Roxburgh
By KARL W. FLOCKS
Attorney Nov. 15, 1960 A. G. ROXBURGH 2,960,073

PRESSURE FLUID CONTROL VALVES

Filed Dec. 24, 1957 18 Sheets-Sheet 10

Inventor
Allan Gordon Roxburgh
By KARL W. FLOCKS
Attorney

PRESSURE FLUID CONTROL VALVES
Filed Dec. 24, 1957 18 Sheets-Sheet 11
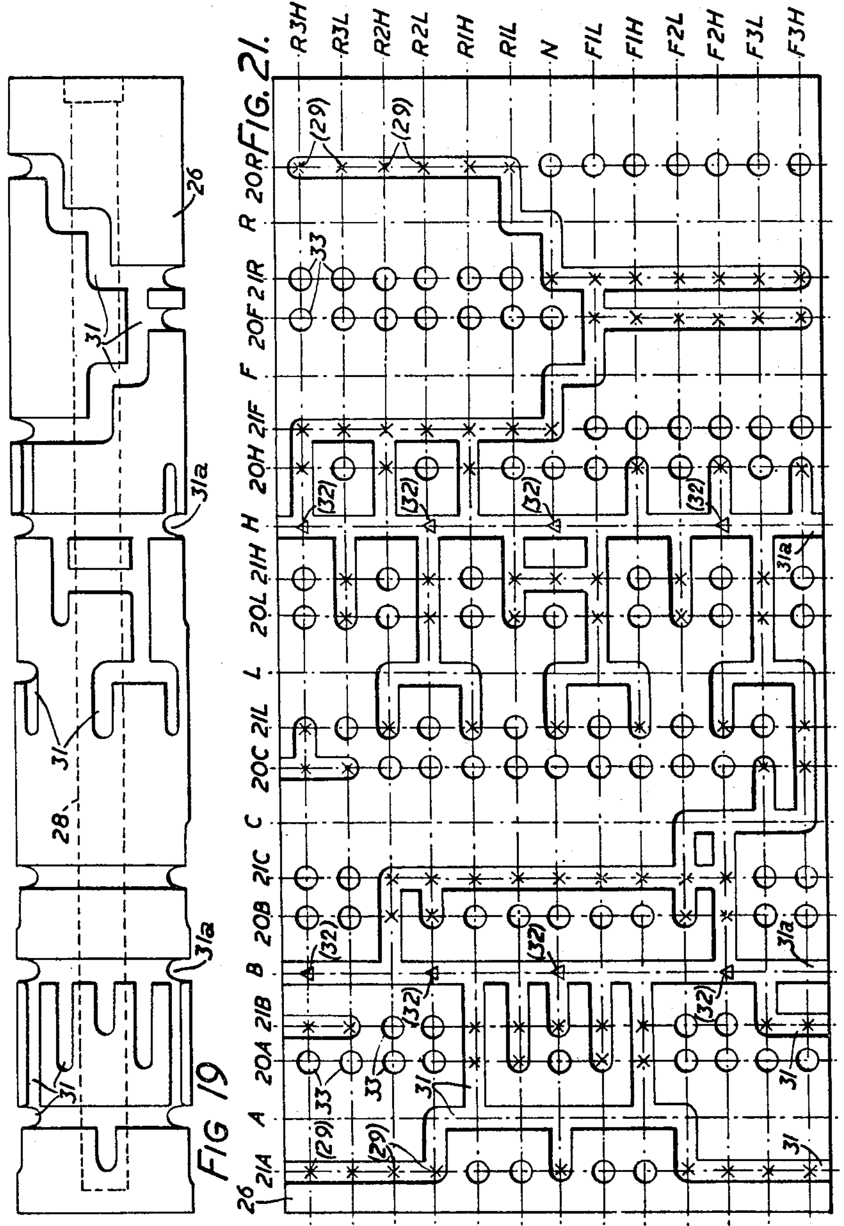
Inventor
Allan Gordon Roxburgh
By Karl W. Flocks
Attorney Inventor
Allan Gordon Roxburgh
By Karl W. Flocks
Attorney

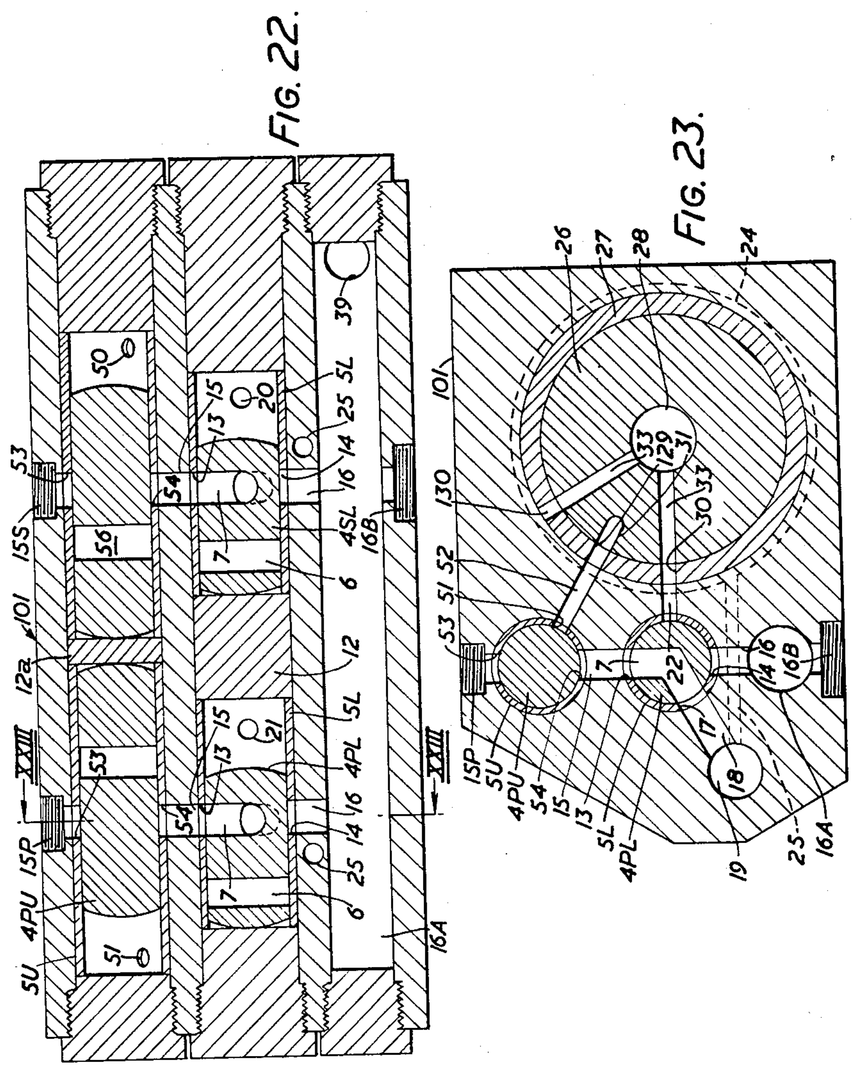
Inventor
Allan Gordon Roxburgh
By Karl W. Flocks
Attorney

Nov. 15, 1960 A. G. ROXBURGH 2,960,073
PRESSURE FLUID CONTROL VALVES
Filed Dec. 24, 1957 18 Sheets-Sheet 14
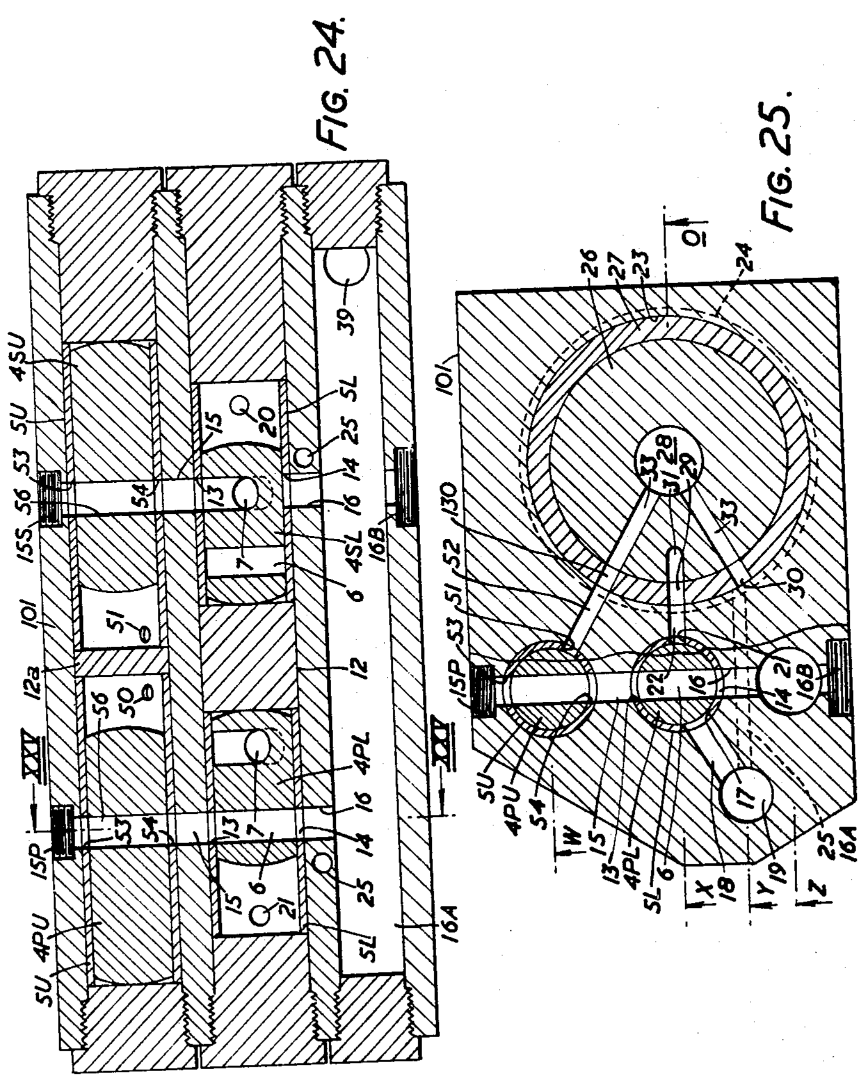
Inventor
Allan Gordon Roxburgh
By Karl W. Flocks
Attorney Inventor
Allan Gordon Roxburgh
By Karl W. Flocks
Attorney Inventor
Allan Gordon Roxburgh
By KARL W. FLOCKS
Attorney

PRESSURE FLUID CONTROL VALVES

Inventor
Allan Gordon Roxburgh

By KARL W. FLOCKS
Attorney

PRESSURE FLUID CONTROL VALVES

Filed Dec. 24, 1957

Inventor
Allan Gordon Roxburgh

By KARL W. FLOCKS
Attorney

United States Patent Office 2,960,073

Patented Nov. 15, 1960

2,960,073

PRESSURE FLUID CONTROL VALVES

Allan Gordon Roxburgh, Chew Magna, England (The Batch, Chew Magna, Somerset, England)

Filed Dec. 24, 1957, Ser. No. 705,070

9 Claims. (Cl. 121—46.5)

This invention relates to pressure fluid control valves capable of operating pneumatic or hydraulic motors, and has for an object to provide a construction of valve which is capable of controlling the actions of a plurality of such motors, whether single or double acting, independently in any desired sequence or in groups in accordance with a predetermined program.

Applications of such control valves are found throughout industry for the operation of multiple-action machines, such as automatic machine tools, or for the control of variable ratio transmissions such as are commonly used in road and rail vehicles, earth moving machines, and the like. Fluid pressure control systems are also used in the automatic control of industrial processes where different operations are required to be carried out in a particular order on a time basis or in dependence on fluctuations in some independent variable or condition such as ambient temperatures, internal pressure, concentration, and so on. In many such industrial applications, however, it is common practice to provide a separate control valve for each motor—which may be rotary or reciprocatory—the separate valves being either manually controlled or linked electrically or mechanically to a central controller. The present invention aims at replacing such separate valves in many installations with one single valve for operating the various motors and into which any desired sequence or program can be built.

A control valve according to the present invention consists essentially of a two-position shuttle valve interposed in the working fluid circuit of each motor, the position of this shuttle valve—and hence the action of the motor—being determined by a movable selector element, which is preferably in the form of a rotary drum, to which control fluid pressure and exhaust connections are made and in which are formed pairs of control fluid inlet and outlet ports, one pair of each shuttle in each control position of the selector element. At each control position, each pair of these control ports communicates with opposite sides of a respective shuttle so that the latter is moved in accordance with the direction of the pressure difference between the appropriate pair of control ports. Hence the pattern of the control inlet and outlet ports on the selector in its various control positions can be determined in accordance with the required program of actions of the controlled motors.

The selector element, or drum, may have a tortuous channel or track formed in the thickness thereof to communicate with all the control ports of one kind—preferably the inlet ports—and is advantageously constructed by shrinking a sleeve containing the control inlet and outlet ports over a hollow core in the cylindrical surface of which an open groove or channel is formed which registers with all the chosen control ports.

In a modified arrangement, a second shuttle valve is conveniently interposed in the working fluid circuit of each motor, the function of this second shuttle being solely to open or close the circuit. In the case of an hydraulic system, closure of the working fluid circuit of the motor results in locking the motor in one position, and prevents over-riding of the motor by, say, an external force or condition—such as water pressure on a ship's rudder. The second shuttle is similarly controlled to the first, via its own control inlet and outlet ports in the selector element.

Practical embodiments of the invention will now be described, purely by way of illustration, with reference to the accompanying drawings in which:

Figure 15 is a schematic section similar to Figure 2 and taken mainly on the line XV—XV of Figure 14;

Figure 17 is a schematic section similar to Figure 15 and taken on the line XVII—XVII of Figure 16;

Figure 18 is a plan view of Figure 14;

Figure 19 is a side view of the core of the selector drum assembly of Figures 14–17;

Figures 20 and 21 are developed diagrams similar to Figures 6 and 9, respectively, of the sleeve and core of the selector drum assembly of Figures 14–17;

Figure 22 is a longitudinal section similar to Figure 1 of a third embodiment;

Figure 23 is a schematic section similar to Figure 2 and taken mainly on the line XXIII—XXIII of Figure 22;

Figure 24 is a longitudinal section similar to Figure 22 showing the parts in different positions;

Figure 25 is a schematic section similar to that of Figure 23, and taken mainly on the line XXV—XXV of Figure 24;

Throughout the drawings, similar parts carry similar reference numerals.

Figure 1:
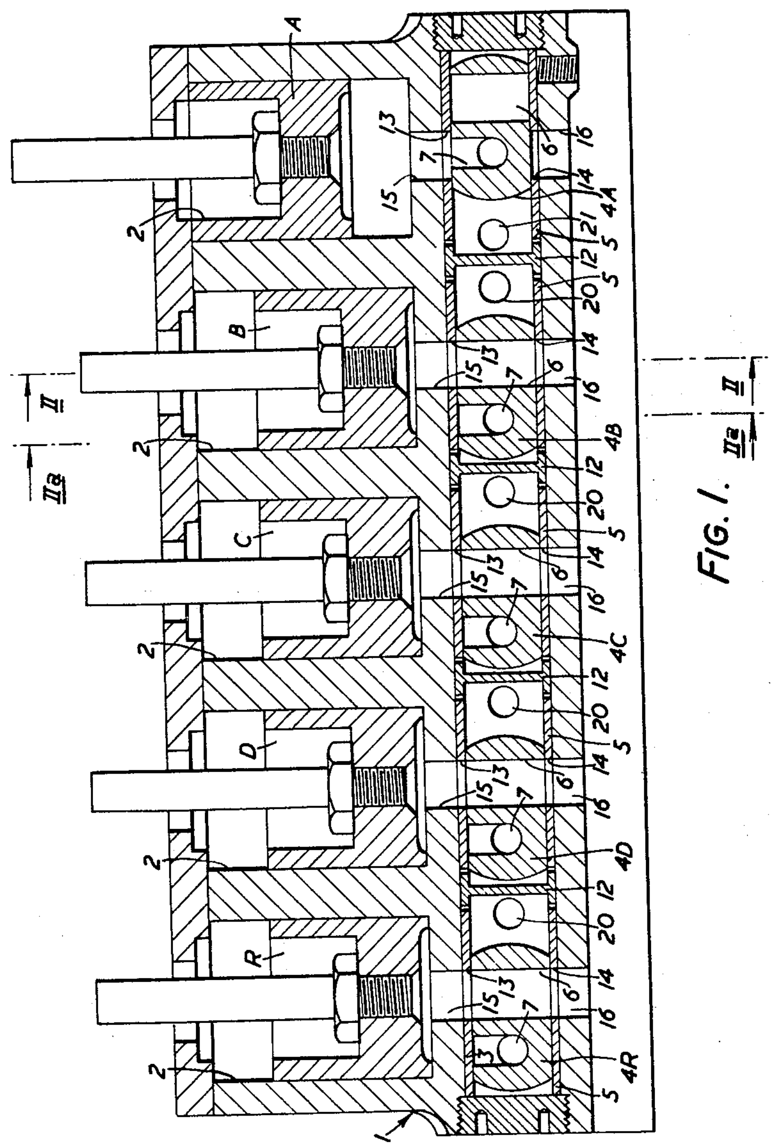
Figure 1 is a longitudinal sectional elevation on the line I—I of Figure 2 showing a first embodiment with the parts in one operative state.
Figure 2:
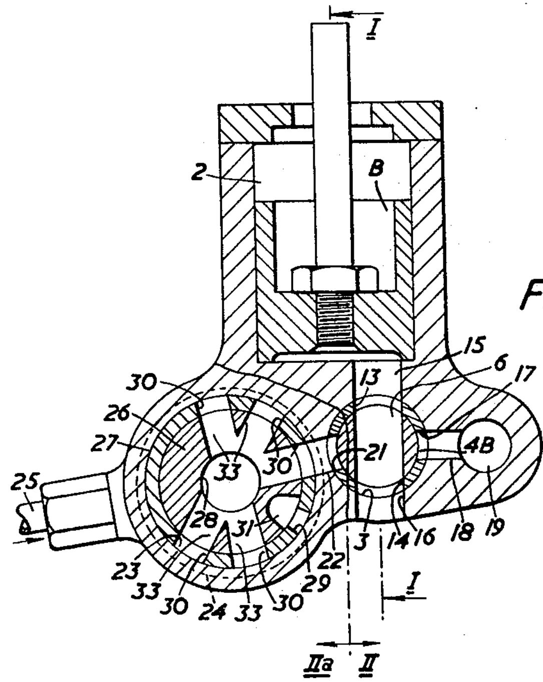
Figure 2 is a schematic section mainly on the line II—II of Figure 1, and showing certain shuttle control ports and ducts in cross-section.
Figure 4:
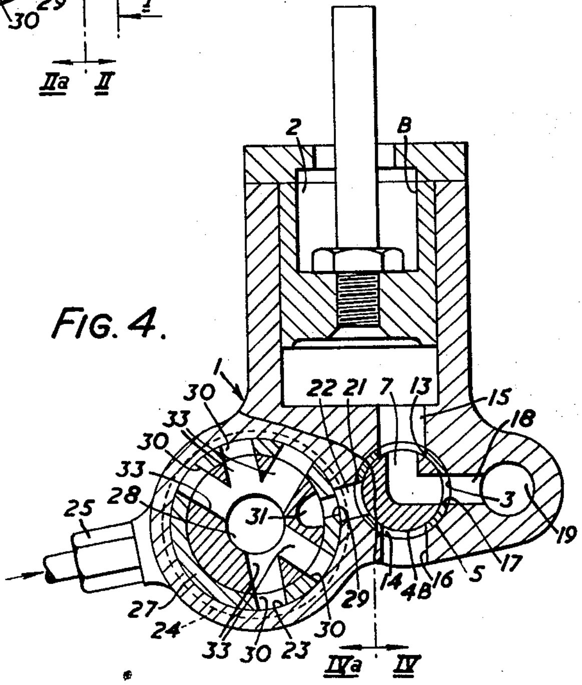
Figure 4 is a schematic section, similar to Figure 2, and taken mainly on the line IV—IV of Figure 3.

Referring first to Figures 1–13, the selector valve illustrated therein is suitable for the control of five operations, such as the selective engagement of the gears in a conventional four-speed and reverse gearbox. The valve consists of a main body or cylinder block 1 having five cylinders 2 within which work respective main pistons A, B, C, D, R. These constitute the pressure fluid motors to be controlled by the selector valve. Beneath all the cylinders runs a shuttle bore 3 in which are mounted five shuttle assemblies each consisting of a reciprocable shuttle valve 4 slidable in a shuttle sleeve 5 (see especially Figures 10–13). In Figures 1–4, the individual shuttles are differentiated by the suffix A . . . R which is appropriate to the corresponding piston. Each shuttle 4 has a diametral exhaust passage 6 near one end and an angled pressure passage 7 near the other end, both arms of the latter being radial and the axis of one arm being co-planar with that of the exhaust passage 6. The shuttle 4 has a laterally projecting locating peg 8 which engages in a slot 9 in the corresponding sleeve 5.

Each sleeve 5 has a pair of diametrically opposed notches 10 in each end which are engaged by nibs 11 on the adjacent face of a separator disc 12 (see particularly Figures 12 and 13) which serves also as an hydraulic seal between adjacent sleeves 5 and the wall of the shuttle bore 3 so that each sleeve constitutes a closed cylinder for its respective shuttle. This separator may be of a relatively soft non-corrosive metal or a synthetic resin plastic material. Thus, when a series of sleeves 5 and separators 12 are assembled end-to-end, a predetermined angular orientation of the sleeves about the axis of the shuttle bore 3 is ensured. Since the sleeves 5 are preferably introduced into the bore 4 from one end thereof, this angular orientation of the sleeves with respect to each other may be correlated with a fixed datum in the bore 3 by either assembling the series of sleeves 5 and separators 12 in a loading tube which is then appropriately registered with the mouth of the shuttle bore and serves to feed the assembly thereinto, or suitable locating projections may be provided at the other end of the bore 3—either permanently or in the form of a jig—to correctly orientate the first sleeve, whereafter successive sleeves 5 are angularly located by the nibs 11 on the separators 12.

The angular orientation of the sleeves 5 is determined by the positions of registering ports in the sleeves 5 and valve body 1. Each sleeve 5 has a central pair of diametrically opposed upper and lower main or working fluid circuit ports 13, 14 which register with cylinder and exhaust ports 15, 16 respectively in the valve body. Each cylinder port 15 communicates with the shuttle bore 3 and a respective cylinder 2 below the piston A . . . R therein, whilst each exhaust port 16 opens from the shuttle bore 3 to the outside of the valve body 1. Each sleeve 5 also has a central working fluid circuit pressure port 17, whose axis lies in a plane perpendicular to that of the ports 13, 14 and notches 10 containing the axis of the sleeve. The working fluid circuit pressure port 17 registers with a corresponding duct 18 in the valve body 1, all the ducts in turn opening through the wall of a working fluid feed channel 19 which runs along the body 1 parallel to the shuttle bore 3. A working fluid circuit hydraulic pump (not shown) maintains fluid pressure in the channel 19.

On the opposite side of each sleeve 5, and adjacent each end, are shuttle transfer ports 20, 21 each of which registers with a duct 22 communicating between the shuttle bore 3 and a selector drum bore 23 of larger diameter than, and parallel to, the shuttle bore 3. At one end of the selector drum bore 23 is a circumferential control fluid feed groove 24 into which opens a control circuit pressure fluid inlet pipe 25. In this bore 23 is snugly fitted a selector drum assembly consisting of a core 26, in the form of a thick-walled hollow cylinder over which is pressed or shrunk a perforated sleeve 27 (see especially Figures 6–9). The core 26 and the sleeve 27 extend for the full length of the bore 23, and the axial cavity 28 in the core constitutes a control circuit exhaust channel closed at one end and opening at the other end through a rotary seal (not shown) to a reservoir for hydraulic fluid in the control circuit.

Figure 6:
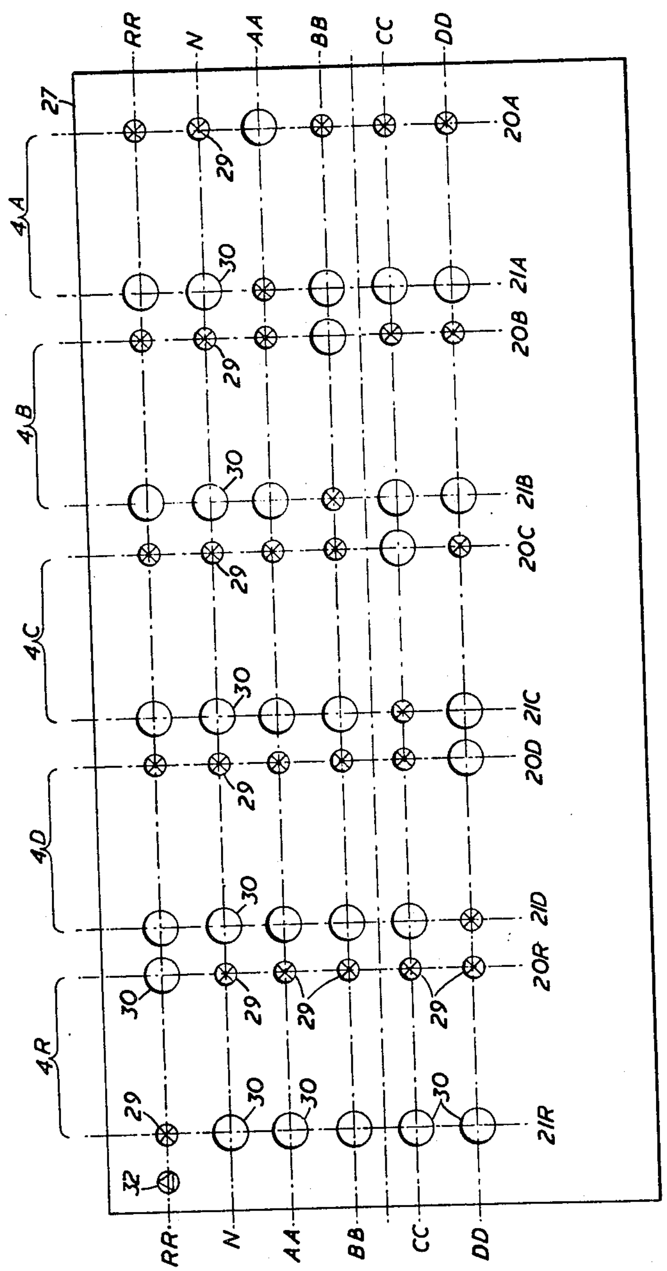
Figure 6 is a developed diagram of the sleeve component of the selector drum assembly showing the pattern of inlet and exhaust holes.
Figure 7:
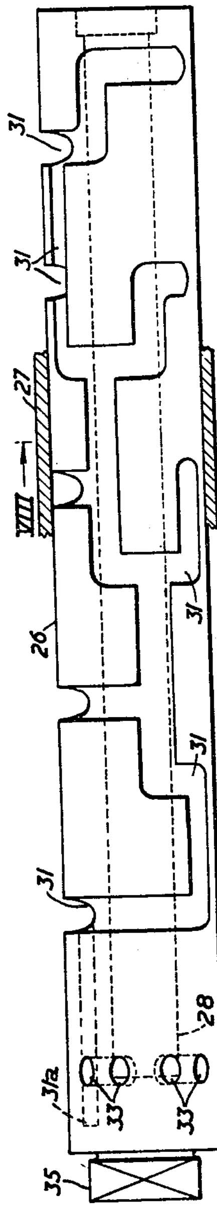
Figure 7 is a side-elevation of the core component of the selector drum.

The circumference of the sleeve is marked off both longitudinally and peripherally, the longitudinal axes being equiangularly spaced generatrices AA, BB, CC, DD, RR, each representing successive stations or planes in the positioning of the selector drum 26, 27 for operating the respective piston. A sixth generatrix N lies midway between AA and RR. The peripheral axes register with the centres of the successive shuttle transfer ports 20, 21. At each intersection of a generatrix and a peripheral axis a control port is drilled. This may be either an inlet control port 29 or an outlet control port 30, and the pattern of these control ports is determined by the program of operation of the pistons. A typical developed diagram is shown in Figure 6, on which the axes of the shuttle transfer ports are marked 20A, 21A, etc., the suffixes denoting the piston with which the respective shuttle 4 is associated.

Figure 9:
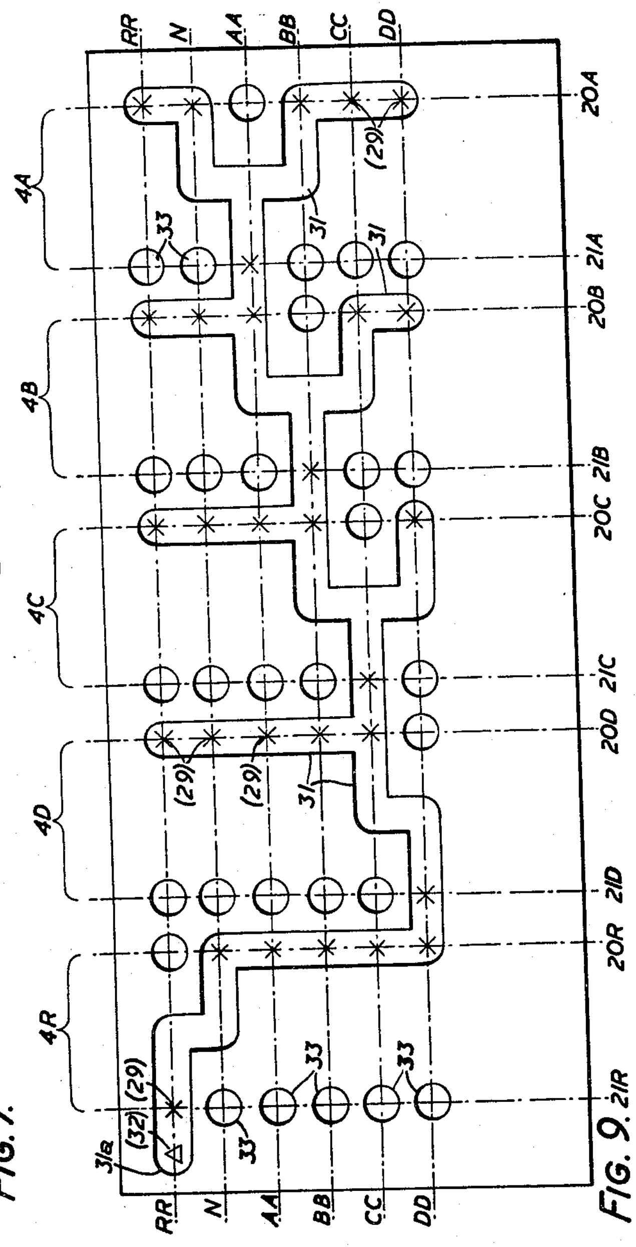
Figure 9 is a developed diagram of the pressure distributing track on the selector drum core.

The core 26 of the selector drum has a continuous tortuous channel or track 31 formed in its surface to a depth less than wall thickness, but having a sufficiently large cross-section to ensure an adequate flow of control fluid from the pump to any shuttle 4. The core 26 and the sleeve 27 are assembled and locked together so that this track interconnects all the pressure inlet control ports 29 in the sleeve 27 and avoids the outlet control ports 30, and at one end 31*a* it registers with a feed hole 32 in the sleeve 27 which in turn is in continuous register with the control fluid feed groove 24 in the valve body 1. Figure 9 shows a developed diagram, corresponding to Figure 6, of the track 31, with the relative positions of the inlet control ports 29 in the sleeve marked by crosses. Where the core 26 registers with an outlet control port 30 in the sleeve 27, the core is drilled through radially at 32 into the central exhaust channel 28, only one row of radial drills being shown in Figure 7. The ports 20, 21, 24, 29 and 30 and the track 31 constitutes a control fluid circuit.

Figure 5:
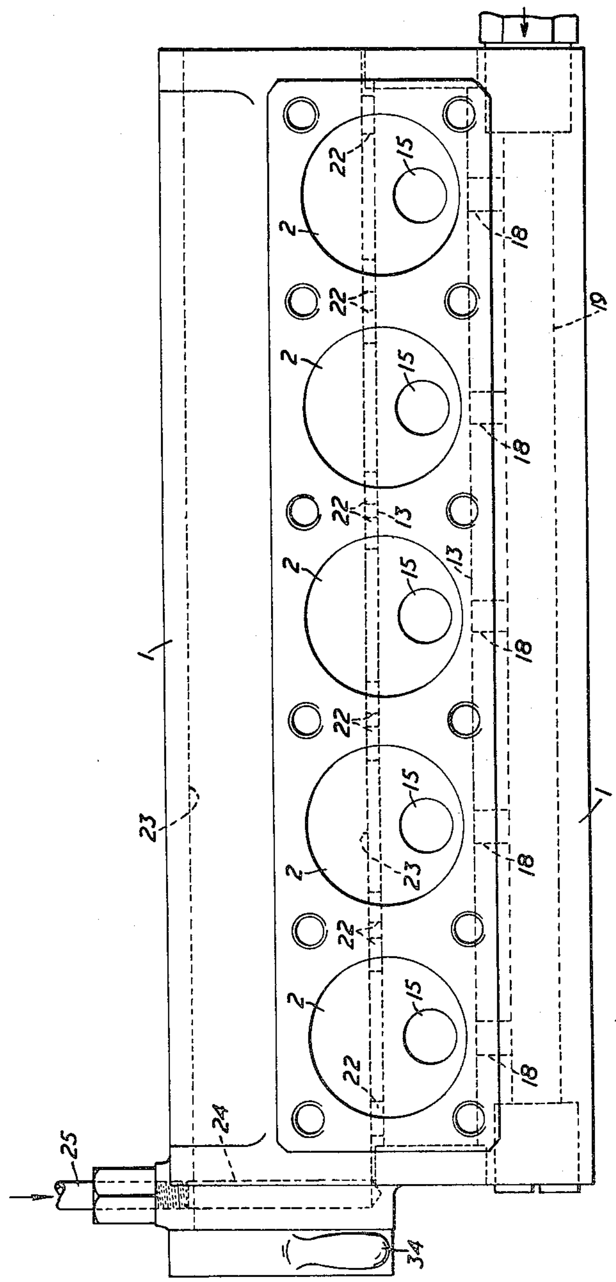
Figure 5 is a plan of Figure 1 with the cylinder cover and pistons removed.
Figure 8:
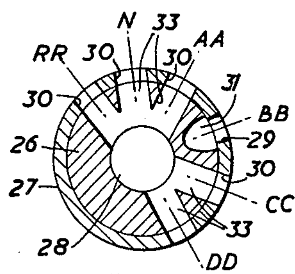
Figure 8 is a section on the line VIII—VIII of Figure 6.
Figure 10:
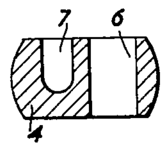
Figures 10 and 11 are, respectively, sectional elevation and plan views of a detail.
Figure 12:
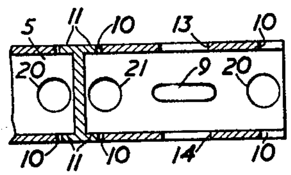
Figures 12 and 13 are, respectively, sectional elevation and plan views of another detail.
Figure 11:
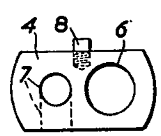
Figure 13:
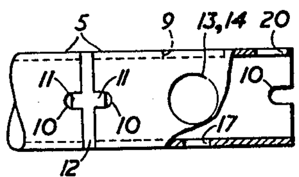

A position setting member for the drum assembly 26, 27—shown in Figure 5 as a handle 34—is fixed on a squared boss 35 (Figure 7) on the end of the core 26. This handle conveniently carries an index (not shown) which registers with calibrations on a fixed scale (also not shown) identifying the six possible positions of the drum. Assuming that the valve shown in Figures 1–5 is intended to control a four forward speed and reverse gearbox, the selectors of which are operated by the motor pistons A . . . R, the six positions represent the selection of any one of the five gears and a neutral position. In Figures 6, 8 and 9, the four forward speed positions are indicated by the letters A to D, neutral by the letter N, and reverse by the letter R.

In operation, gear selection is effected by causing one of the pistons A . . . R to be raised by oil pressure admitted into its cylinder 2 through the working fluid circuit ports 13 and 15 by the appropriate shuttle 4. In neutral, therefore, all the pistons must be at the bottom of their several cylinders. Hence all the cylinder ports 15 must be connected to the working fluid exhaust ports 16, so that each shuttle must be in the position in which its exhaust passage 6 registers both with the ports 13, 15 and with the ports 14, 16 (Figures 1–4).

Figure 3:
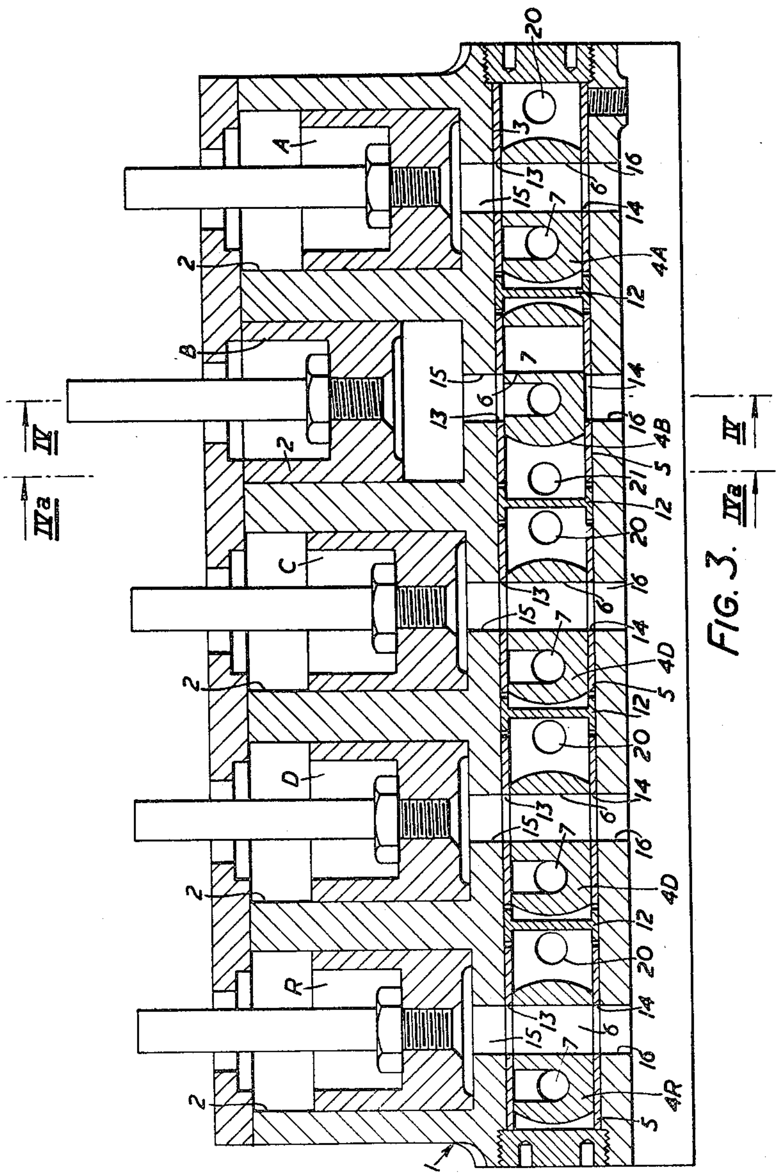
Figure 3 is a section similar to Figure 1 showing the parts in another state.

As shown in Figures 1 and 3, this condition is satisfied if all the shuttles 4 are moved to the left-hand limits of their travel.

Considering now the developed diagram of Figure 6, the sleeve 27 has alternate inlet and outlet control ports 29, 30 at the successive points of intersection of the generatrix N with the several peripheral axes 20A . . . 21R, the right hand port of each pair being an inlet control port 29. If, therefore, the selector drum 26, 27 is rotated to bring this generatrix N into the plane containing the axes of the shuttle transfer ports 20, 21 and their associated ducts 22 (see Figures 2 and 4), oil under pressure, which is admitted from the control circuit fluid feed connection 25 and supply groove 24, through the feed hole 32 in the sleeve 27, to the end **31*a* of the track 31 and distributed thereby to all the inlet control ports 29 in the sleeve, passes through the ports 29 which are in register with corresponding ducts 22 and enters the right hand ends of all associated shuttle sleeves 5. Simultaneously, all the outlet control ports 30 lying on the generatrix N register with all the remaining ducts 22 to connect the shuttle transfer ports 21 with the control circuit exhaust channel 28 in the selector drum through the radial drillings 33. Hence all the shuttles 4 move to the left in Figures 1 and 3, and all the cylinders 2** are opened to exhaust. No gear is selected, and the box is in neutral.

To select 1st gear, the selector drum is rotated to bring the generatrix AA into the position just occupied by the generatrix N, and which may be regarded as the datum position. In this new position of the selector drum, the control circuit connections through the control ports 29, 30 to the shuttles 4B, 4C, 4D, and 4R remain as before. This can be seen by comparing the patterns of control ports in the two lines N and AA in Figure 6 or Figure 9. The connections to the shuttle 4A, however, are now reversed so that the previous pressure inlet transfer port 20 in the shuttle sleeve 5 is open to exhaust and the previous exhaust transfer port 21 is open to pressure. The shuttle 4A therefore moves to the right, and takes up the position shown in Figure 1. In this position, the working fluid exhaust ports 14, 16 are shut off, and the cylinder port 15 is in communication with the working fluid feed channel 19 through the angled passage 7 in the shuttle. The motor piston A is accordingly raised to operate the first gear selector fork or similar mechanism.

On changing into 2nd gear, the selector drum is moved to bring the generatrix BB into the datum position. The control port pattern along this generatrix differs in two places from the previous one, viz: at the 4A and 4B positions on the developed diagrams. Here the shuttle transfer port connections are reversed with respect to those on generatrix AA so that both shuttles 4A and 4B change their positions. For shuttle 4A, this means a return to the neutral setting, and the motor piston A is allowed to fall by the exhausting of its cylinder 2. Simultaneously, piston B is raised by the admisison of oil through the angled passage 7 in the shuttle 4B and the cylinder port 15.

The sequence proceeds thus throughout the full range of positions of the selector drum 26, 27. In order to avoid overlapping of the controlled actions, the time of rise of a motor piston A, etc., may be retarded compared with its time of return, or the initial part of the upward stroke of each motor piston may be idle. Alternatively, if position overlap is required between successive controlled actions, a dashpot device may be incorporated in each cylinder port 15 to restrict the rate of exhaust of oil from beneath the motor piston.

Figures 14–21 illustrate a modified form of selector valve which is primarily intended for controlling a gearbox having six forward and six reverse speeds. This is assumed, for the purpose of the following description, to be arranged in a customary manner as, effectively, three gearboxes in series, one being a three-speed box giving three main or basic ratios, another a two-speed box for giving high and low alternatives of each of these three main ratios; and a third for reversing the direction of rotation of the output shaft. The selector valve therefore makes three simultaneous selections in any one setting—main ratio, high or low, and forward or reverse.

In Figures 14–21, the same reference characters as are used in Figures 1–13 identify the same or functionally equivalent parts. It is, however, to be noted that in the modified arrangement now to be described, the motor pistons for effecting the gear change motions are not shown, since they are preferably distributed at convenient points on the controlled mechanism, and may be in the form of pressure capsules containing diaphragms or bellows. They will, however, for the convenience of the description, be referred to as the pistons A, B, C, L, H, F and R, corresponding respectively to 1st, 2nd, 3rd, low, high, forward and reverse ratios. The settings of the selector drum assembly corresponding to a drive position will be identified by the code F1L, F1H, F2L . . . R3H—indicating "forward first low" etc., as will be understood. Neutral setting of the valve is identified by the reference N.

Referring to Figures 14–18, the relative dispositions of the shuttle bore 3, working fluid feed channel 19, and selector drum bore 23 in the valve body 100 are similar to those of Figures 1–5. There are seven shuttles, 4A, 4B, 4C, 4L, 4H, 4F and 4R, each working in a ported sleeve 5 with spacers 12, all of the same design as shown in Figures 10–13 and having the same pasasges 6, 7 and port connections 13, 14, 17, 20, 21. The working fluid circuit connections to the pistons A, B, C, L, H, F and R are shown as threaded nipples 15′ to which the appropriate pipes may be connected.

Figure 14:
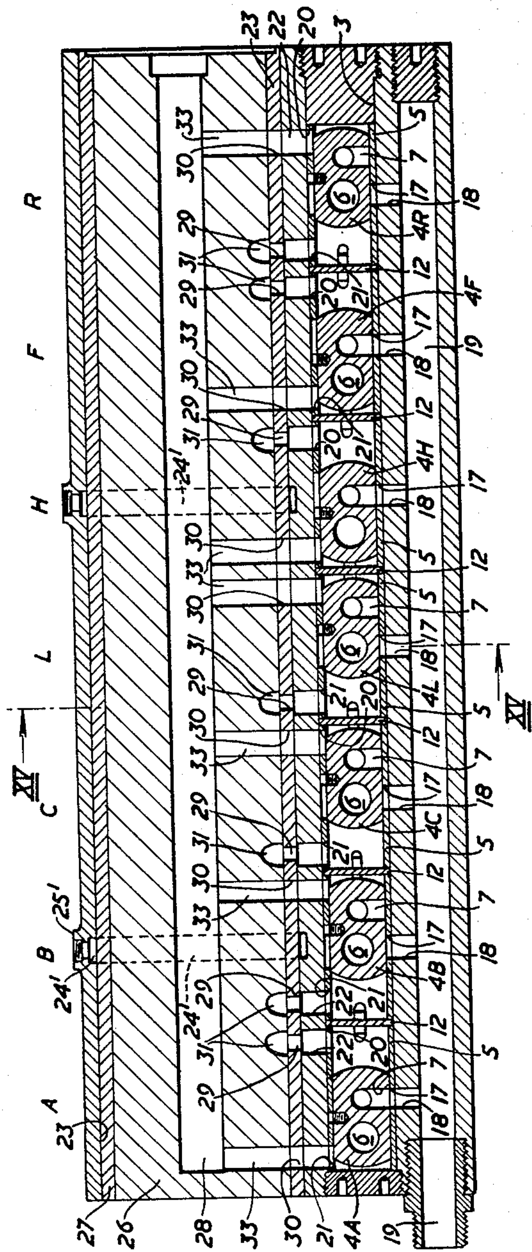
Figure 14 is a longitudinal section similar to Figure 1 of a second embodiment.
Figure 16:
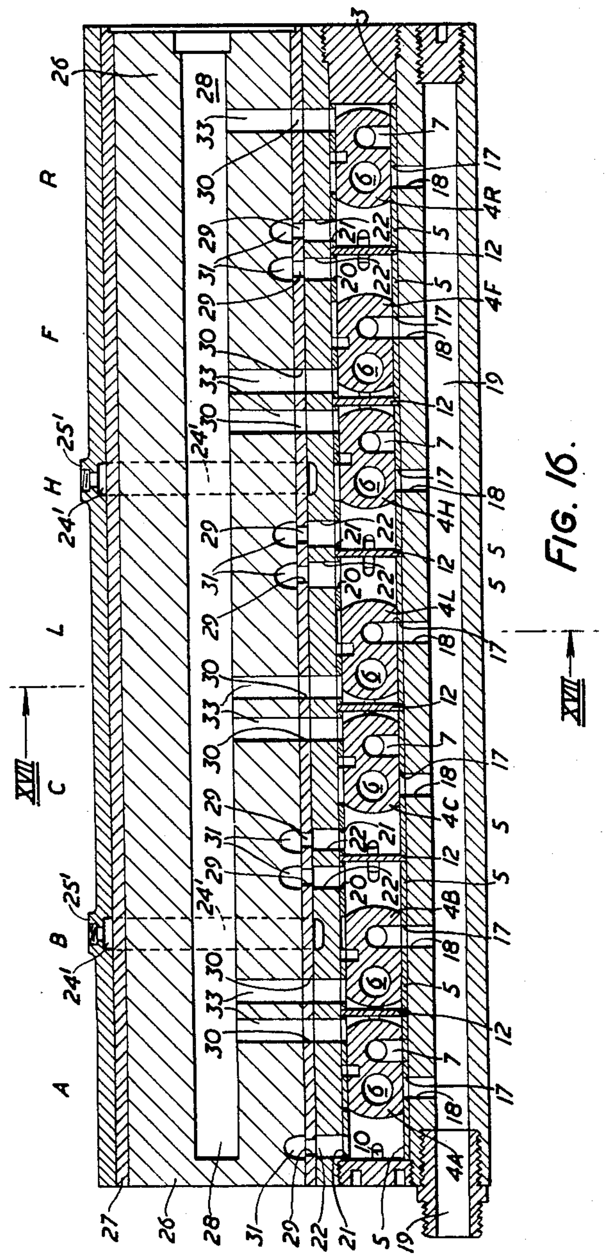
Figure 16 is a longitudinal section similar to Figure 3 but showing the parts of Figure 14 in different positions.
Figure 20:
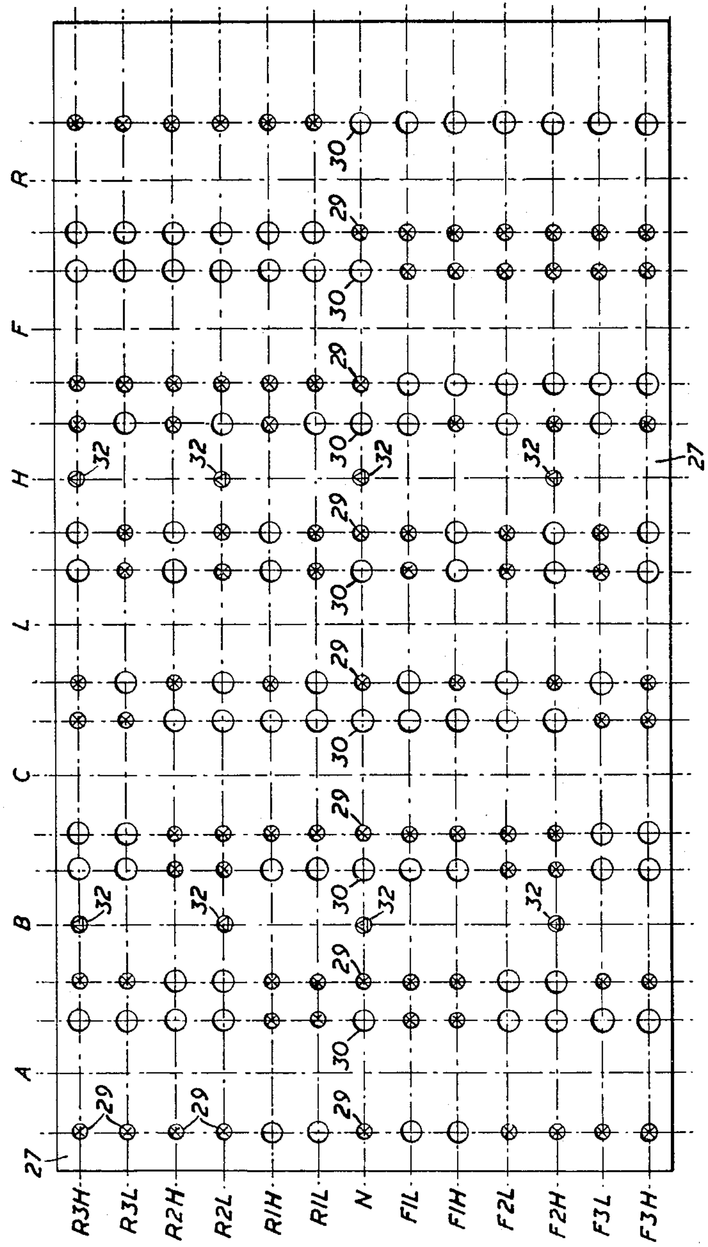

The selector drum assembly 26, 27 is basically similar to that of Figures 1–5, but the pattern of the control ports 29, 30 in the sleeve 27 and of the track 31 in the core 26 is now adapted to a different program which allows three pistons to be operated simultaneously in any drive position. The patterns are illustrated in Figures 20 and 21, where the ratio selecting generatrices are marked F1L, etc., and the shuttle transfer port peripheral axes are shown at 20A, 21A, 20B . . . etc. As before, the pattern of inlet and outlet control ports 29, 30 on the neutral generatrix N shows these holes alternating throughout its length, the inlet control ports 29 being on the left in each pair. Pressure feed to the track 31 may be made at one end of the selector drum assembly, as shown at 24, 25 in Figure 5, but in order to prevent any undue time lag in energisation of a motor piston remote from the feed end, due to the greater length and more tortuous nature of the track 31 in Figure 21, there may be provision for feed at two or three points along the length of the selector drum assembly, as indicated in Figures 14 and 16 at 24′, 25′, where control fluid pipe connections 25′ and circumferential grooves 24′ are shown in the valve body 100 on the mean peripheral axes representing the mid-positions of travel of the shuttles 4B and 4H, respectively. Oil feed ports 32 in the sleeve 27 register both with the grooves 24′ and respective circumferential portions **31*a* of the track 31. Other positions for pressure fluid feed to the track 31** may be selected as preferred.

Figures 14 and 15 show the positions of the selector valve parts when the drive ratio "F1H" (forward, first high) is selected. As will be seen by reference to Figures 20 and 21, the pattern of control ports 29, 30 on the generatrix F1H differs from that on the neutral generatrix N at positions A, H and F. The shuttles 4A, 4H and 4F are accordingly moved to the left in Figure 14, thus admitting working fluid from the channel 19 through the associated ducts 18 and shuttle sleeve ports 17 to the angled passages 7 in these shuttles, and thence via the ports 13 to the respective motor piston circuit nipples 15′. The remaining control ports 29, 30 along the generatrix F1H have the same pattern as on the neutral generatrix N, so that the associated nipples 15′ are connected to exhaust through the straight passages 6 in their shuttles 4B, 4C, 4L and 4R and the working fluid ports 14 and 16.

Figures 16 and 17 show the positions of the parts when the drive ratio "F2L" is selected. Again referring to the developed diagrams of Figures 20 and 21, it is seen that the movement of the selector drum assembly 26, 27 to this new position changes over the shuttles 4A, 4B, 4L and 4H by reversing the register between inlet and outlet control ports 29, 30 in the sleeve 27 and the shuttle transfer ports at 20A, 21A, 20B, 21B, 20L, 21L and 20H, 21H.

In the second embodiment just described, the particular application of the selector valve to a gearbox leads to a symmetry of pattern of the control ports 29, 30 and the track 31, as will be apparent from an inspection of Figures 20 and 21. Clearly, however, a different application may call for a different pattern. Thus, for example, in a process which requires the operation of a different sequence of seven functions on, say, a time basis, the drilling for the control ports 29, 30 of the sleeve 27 will be altered accordingly so as to conform to the desired program, the selector drum 26, 27 then being stepped from one station to the next by a timer. The developed diagram of Figure 20 can, in fact, be directly interpreted in terms of a program of events.

Figure 26:
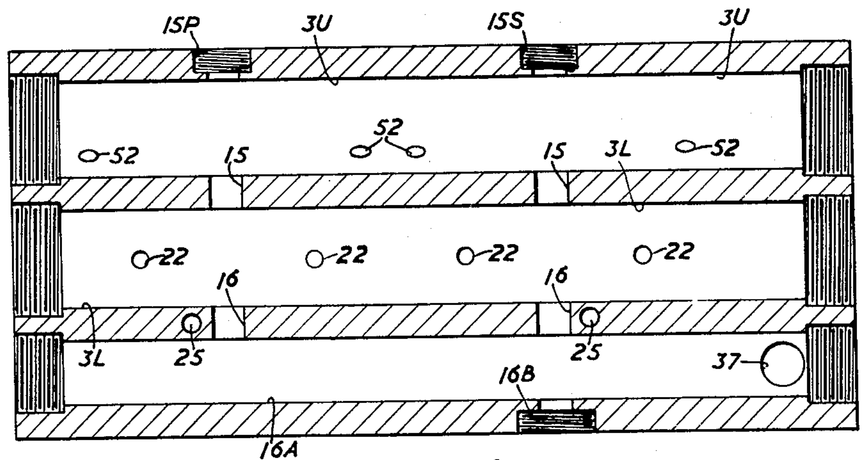
Figure 26 is a longitudinal section through the valve body.
Figure 27:
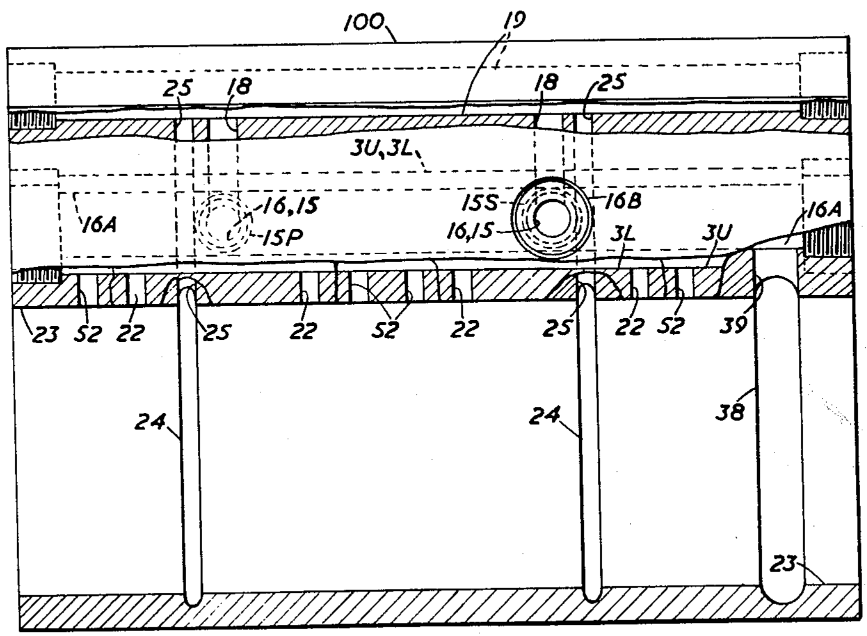
Figure 27 is a composite part-sectional underplan view of Figure 26, sections being taken approximately on the lines OW, OX, OY and OZ of Figure 25.
Figure 28:
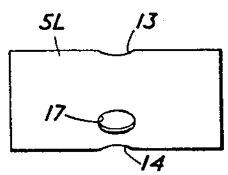
Figures 28–30 show details of construction of the lower shuttle sleeves.
Figure 29:
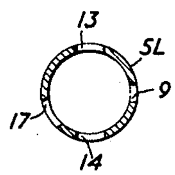
Figure 30:
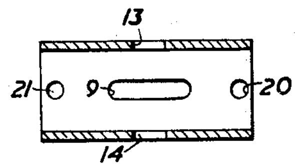
Figure 34:
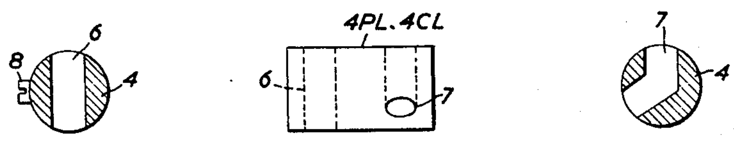
Figures 34 and 35 show the lower and upper shuttles, respectively.
Figure 31:
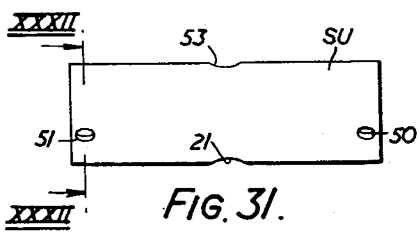
Figures 31–33 show similar details of the upper shuttle sleeves.
Figure 32:
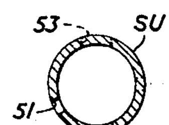
Figure 33:
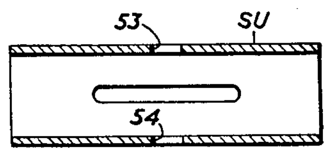
Figure 35:
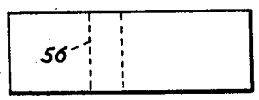

Figures 22–38 illustrate a third embodiment of the invention which is intended for controlling a ship's steering gear. The ship's rudder is assumed to be operated by hydraulic rams, the main pressure fluid connections to which are shown at 15P and 15S in Figures 22–27. (The letters P and S in the references relating to these figures indicate "port" and "starboard" respectively.) These working fluid circuit connections are controlled by two sets of shuttles 4PL, 4SL and 4PU, 4SU, respectively, the suffix L or U denoting a lower or an upper shuttle. The lower shuttles 4PL, 4SL are located in a lower shuttle bore 3L and the upper shuttles in an upper shuttle bore 3U (see Figure 26). The lower shuttles 4PL, 4SL are similarly constructed, and perform a similar function, to the shuttles 4 of the first and second embodiments described above, whilst the upper shuttles 4PU, 4SU function to cut off the working fluid pressure supply or exhaust circuits to the steering ram circuit connections 15P, 15S, respectively, when the rudder has been moved to the position required by the ship's wheel or helm. This ensures that the steering rams are hydraulically locked to hold the rudder in position so long as the helm remains unaltered.

The lower shuttles 4PL, 4SL (Figure 34) are slidable in sleeves 5L (Figures 28–30) having shuttle transfer ports 20, 21 adjacent each end and working fluid circuit ports 13, is permanently in register with a duct 15 which is coaxial with the respective "port" or "starboard" ram connection 15P or 15S, whilst the working fluid circuit port 14 is permanently in register with the appropriate exhaust port 16 in the body 100. The latter leads into a common working fluid exhaust chamber 16A having an outlet connection at 16B. The working fluid circuit pressure port 17 registers with a pressure inlet duct 18 which communicates with a working fluid feed channel 19. This channel also supplies pressure fluid for the shuttle control circuit through two ducts 25 to corresponding grooves 24 around the bore 23 which houses the selector drum assembly 26, 27 (see particularly Figure 27).

The upper shuttles 4PU, 4SU work in respective sleeves 5U (Figures 31–33) and each has a single diametral passage 56 (Figure 35) which registers with or closes a pair of diametrically opposed working fluid circuit ports 53, 54 in the sleeves 5U. When the sleeves 5U are correctly assembled in their bore 3U in the valve body 101, the ports 53, 54 register respectively with the corresponding ram connection 15P, 15S, and with the coaxial duct 15. Shuttle transfer ports 50, 51 at either end of the sleeve 5U register with respective inclined control circuit ducts 52 which communicate with the selector drum bore 23. A spacer 12*a* separates the sleeves 5U in the bore 3U.

The selector sleeve 27 has two sets of control ports 29, 30 and 129, 130 spaced circumferentially by the angle between the axes of the ducts 22, 52. The control ports 129, 130 relate to the upper shuttles 4PU, 4SU and the inlet and outlet control ports of each pair are spaced further apart than are the lower shuttle inlet and outlet control ports 29, 30. The upper shuttle control ports 129, 130 lie on circumferential axes marked PU, SU in the developed sleeve diagram of Figure 36 and the lower shuttle control ports 29, 30 lie on circumferential axes marked PL, SL. The control ports are drilled at the intersections of these axes with equidistant generatrices of the sleeve surface, but since the ducts 22, 52 to the respective sleeve bores 3L, 3U are at an angle to each other, the positional control settings of the drum 26, 27 are represented by oblique lines each intersecting one upper and one lower control port. These lines are shown in Figure 36 at N, P and S, representing Neutral or rudder locked, "Port" and "Starboard" respectively.

Figure 38:
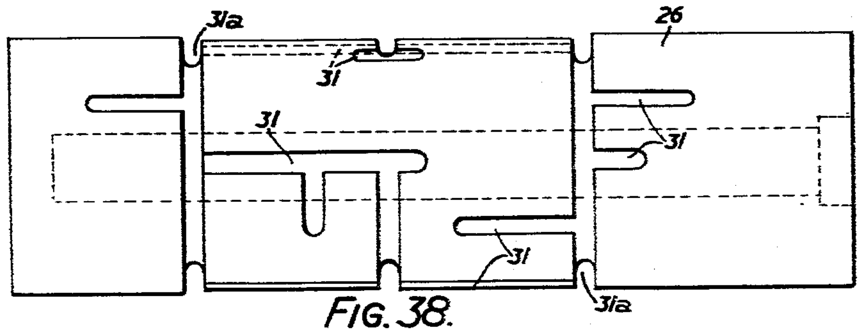
Figure 38 is a side elevation of the selector core.

Between the pairs of "port" and "starboard" lower shuttle control ports 29, 30 are control circuit oil feed ports 32. These lie at equiangular spacings around the sleeve 27 on circumferential axes OF, and register with circumferential sections 31*a* of the track 31 on the selector core 26 (Figures 37 and 38). They also register with the annular grooves 24 around the wall of the selector bore 23 so that control fluid under pressure is continuously being supplied to the track 31. The central control circuit exhaust channel 28 in the core 26 communicates with the common exhaust chamber 16A through radial drillings 36 and registering ports 37 in the sleeve 27 (see Figures 36 and 37), the ports 37 opening into annular exhaust groves 38 (Figure 27) which are connected by a duct 39 in the body 101 to the common exhaust chamber 16A. By supplying pressure fluid to the selector drum 26, 27 and exhausting it through the internal ducts and annular grooves 25, 24 and 38, 37 respectively, no rotary fluid couplings are required on the selector drum assembly.

In use, the valve body 101 is mechanically coupled to the ship's wheel or helm while the selector drum assembly 26, 27 is linked to the rudder beam for rotation in unison with the rudder. The arrangement conforms to a well-known follow-up system whereby the valve always tends to assume a neutral or shut-off position when the rudder is in the position dictated by the helm. This is the position shown in Figure 22, and represents the arrangement of the shuttles when the control ports 29, 30 and 129, 130 along the line N in Figure 36 are in register with the respective ducts 22, 52 in the valve body. From Figure 22 it is seen that the lower shuttles 4PL and 4SL are moved to the left so that their angled passages 7 are in register with the working fluid pressure ports 17 and the ducts 15. The latter, however, are blanked off by the upper shuttles 4PU, 4SU, which are in their mutually inward positions. Hydraulic working fluid cannot therefore pass to either ram connection 15P or 15S, and fluid already in the circuit between these connections and their associated rams cannot escape to exhaust. The rudder is therefore locked by the rams. Furthermore, any tendency for working fluid to leak from either ram circuit past its associated upper shuttle 4PU or 4SU is opposed by an opposite tendency for working fluid under line pressure to leak from the duct 15 and for control fluid, also at line pressure, to leak from the outer ends of the shuttle sleeves 5U past the shuttles to the ram connection.

Figure 36:
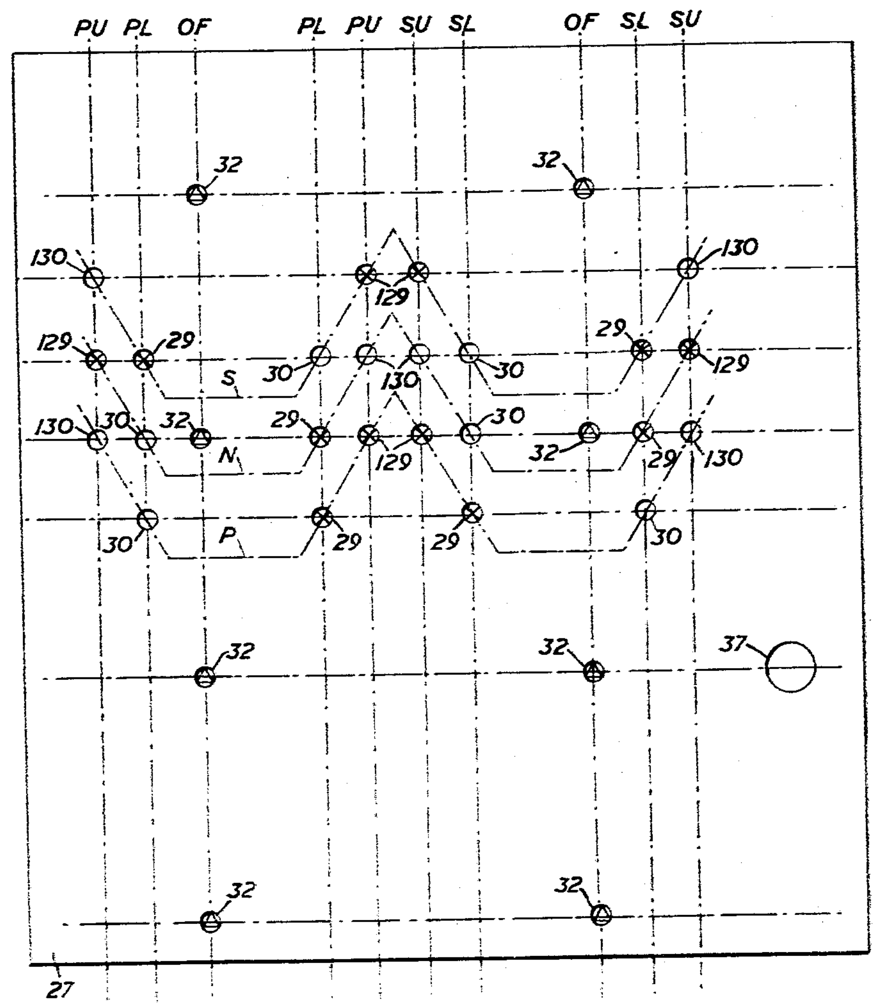
Figures 36 and 37 are developed diagrams of the selector sleeve and core, respectively.
Figure 37:
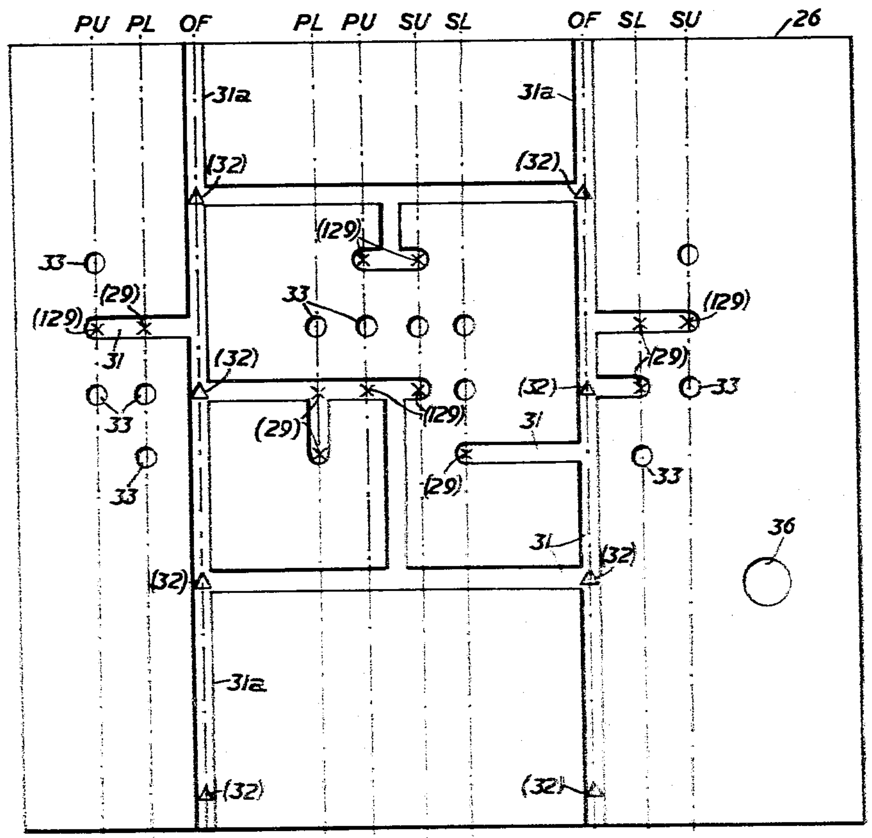

To move the rudder for a turn to starboard, the helm is moved to bring the shuttle control ports 29, 30, 129, 130 or the line S in Figure 36 into register with the ducts 22, 52. The shuttles now take up the positions shown in Figure 24. The starboard lower shuttle 4SL, which was already in the position for supplying pressure fluid to the starboard ram connection 15S, does not move, but the other three change over. Reversal of the starboard upper shuttle 4SU brings its through passage 56 into register with both the working fluid inlet duct 15 and the ram connection 15S, so that the associated ram is acted upon by full line pressure. Simultaneously, the reversal of the "port" shuttles 4PU, 4PL brings their respective through passages 56, 6 into alignment with the "port" ram connection 15P, duct 15, and exhaust port 16, permitting the working fluid in the "port" ram circuit to exhaust through the chamber 16A and outlet 16B. The rudder moves until the follow-up connection brings the selector drum back to the initial shut-off position of Figure 22. Similarly for a turn to port, the upper shuttles 4PU, 4SU move outwards to their open positions, as in Figure 24, but the lower shuttles 4PL, 4SL, reverse their relative positions with respect to those shown in Figure 24.

The foregoing description illustrates how the invention may be applied, first to the control of single operations carried out alternatively; secondly to the control of different groups of operations, the composition of each group being variable if necessary; and thirdly to the control of reversible follow-up system. From this it will be evident that many other sequences and combinations of operations can be controlled by a selector valve according to the present invention, the desired program being represented by a pattern of inlet and outlet control ports on the selector element itself. Furthermore two or more programs may, if desired, be carried out by the same selector drum. For this purpose, each pattern of control ports 29, 30 representing a respective program occupies a segment only of the cylindrical surface of the drum.

In the embodiments described above, it has been assumed that each motor is single-acting, requiring only one working fluid connection to its associated shuttle. Double-acting motors may, however, be used if desired, in which case each shuttle may have three through passages, any two of which are adapted to register simultaneously with two working fluid ports communicating with opposite ends of the motor, whilst two pairs of working fluid pressure and exhaust ports are formed in the sleeve.

Although the inlet control ports 29 have been described above as being interconnected by the track 31 whilst the outlet control ports 30 communicate with the axial exhaust channel 28 in the core 26, this arrangement may, if preferred, be inverted, so that the track 31 interconnects all the outlet control ports 30 and the axial channel 28 becomes a common pressure fluid supply chamber for the inlet control ports 29.

As exemplified by the first embodiment, a program of actions of the controlled motors may consist simply of the cancellation of one motor action as a necessary condition of initiating the next in a sequence in which one motor only is actuated at a time. The order of selection of the operative motors is not, however, necessarily determined when the selector drum is under manual control. The valve is, however, readily adaptable for automatic control in cases where as predetermined sequence of motor actuations is essential—as, for example, in an industrial process where certain controlled events must take place in a given time sequence. On the other hand, the valve may be required to actuate the controlled motors in a changing sequence, or in changing combinations, in dependence on fluctuations in an independent variable such as ambient temperature or pressure. In this case, all the possible motor actions, or combinations thereof, are represented by the control port pattern, and positioning of the selector drum is under the control of a device responsive to the independent variable.

It may sometimes be required to allow for a range of alternative programs of operation of an otherwise standard control valve which is greater than can economically be catered for on a single multi-program selector drum. In this event, two or more selector drums may be provided for alternative insertion into the selector bore 23 so as to avoid the necessity for breaking and remaking the working fluid connections at each change of program. This arrangement also permits the valve body to be made integral with the controlled apparatus, which may lead to economies of space or manufacture which outweigh the disadvantage of making two or more selector drums which are interchangeable.

All forms of the invention, however, have the common features of a plurality of two-position shuttle valves each of which is operative to determine the working fluid circuit connections to each motor by means of pairs of inlet and outlet control ports each of which is selectively registrable with corresponding transfer ports in an associated shuttle cylinder.

In certain applications, the quantity of hydraulic fluid required to operate the controlled motors may be so small as to enable the shuttle valves to be dispensed with, the supply and exhaust of fluid to and from the motors then being direct through the control ports in the selector drum. In other cases, some of the controlled motors may require large quantities of fluid whilst others require only small quantities. The control valve according to the invention may then employ shuttles only for those motors requiring the large volume of fluid, the remaining motors being energised direct through the control ports on the selector drum.

I claim:

1. A pressure fluid control valve comprising a valve body; working fluid circuit connections in the said body for a plurality of pressure fluid motors; a common working fluid pressure supply channel; a common working fluid exhaust channel; a freely reciprocable shuttle valve interposed between each of said motor circuit connections and the said common pressure supply and common exhaust channels; passages in said shuttle for the alternative completion of a working fluid path between each motor circuit connection and said supply or said exhaust channel; a cylinder for each shuttle; working fluid ports in said cylinder registering respectively with said motor circuit connection, said supply channel and said exhaust channel; control fluid transfer ports in said cylinder adjacent each end thereof; a selector element movable in said valve body to any one of a number of predetermined control positions depending on the required number of motor actions; a pair of control fluid inlet and outlet ports in said selector element, one pair for each shuttle and for each control position of said selector element, the ports of each said pair being registrable with the corresponding transfer ports in each control position of said selector element; and a common control fluid pressure source for all said control inlet ports.

2. A control valve as claimed in claim 1 wherein the selector element is a drum having the control inlet and outlet ports opening through the cylindrical surface thereof and a control fluid track formed in the thickness of the cylindrical wall of the drum interconnecting all control ports of one kind.

3. A pressure fluid control valve comprising a valve body; working fluid circuit connections in said body for a plurality of controlled pressure fluid motors; a working fluid supply duct and a working fluid exhaust duct for each motor circuit; a shuttle valve interposed between each motor circuit connection and each supply duct and exhaust duct and freely reciprocable between two limit positions; a common bore in the valve body for the coaxial housing of said shuttles; ports opening into said bore at the location of each shuttle and communicating respectively with the corresponding motor circuit connection, the corresponding working fluid supply duct, and the corresponding working fluid exhaust duct; passages in each shuttle for connecting the respective motor circuit port alternatively with the corresponding working fluid supply port and the corresponding working fluid exhaust port; a transfer port opening into said bore adjacent each limit of travel of each shuttle; a selector bore in said body adjacent and parallel to said shuttle bore; a transfer duct communicating between said bores at the location of each transfer port; a selector drum rotatable in fluid-tight manner in said selector bore between successive angularly spaced control positions; a plurality of pairs of control fluid inlet and outlet ports in the periphery of said drum the ports of any pair being located for simultaneous register with the pair of transfer ports associated with the corresponding shuttle, there being as many pairs of control inlet and outlet ports as there are control positions of the drum; a common control fluid inlet in the drum to all control inlet ports; and a common control fluid outlet in the drum from all control outlet ports.

4. A control valve according to claim 3 wherein the selector drum comprises a cylindrical sleeve having the control inlet and outlet ports formed therethrough and a hollow cylindrical bore having an axial cavity constituting the common control fluid outlet; a tortuous control fluid conducting track formed in its cylindrical surface to register with all the control inlet ports in the sleeve; and radial drills through the wall of the core communicating between each control outlet port and the axial cavity.

5. A pressure fluid control valve comprising a valve body; working fluid circuit connections in said body for a plurality of controlled pressure fluid motors; working fluid supply and exhaust ports in said body; a freely slidable shuttle valve in said body interposed in the working fluid circuit between each controlled motor circuit connection and said working fluid supply and exhaust ports; a cylinder for said shuttle; a working fluid port in said cylinder communicating with a respective motor circuit connection; other working fluid ports in said cylinder communicating respectively with said supply and exhaust ports; passages in said shuttle for connecting said motor circuit connection alternatively to said supply and said exhaust ports; a control fluid transfer port adjacent each end of said cylinder; a rotary selector drum in said body; and pairs of control fluid inlet and outlet ports spaced at predetermined angular intervals around said drum, the ports of each pair being adapted to register simultaneously with the transfer ports of a corresponding shuttle cylinder in a respective control position of angular adjustment of said drum; a common source of supply of control pressure fluid, for all said control inlet ports; a common exhaust for all said control outlet ports; and means for setting said drum in each successive control position so as to cause all the pairs of control ports associated with said control position to register with their respective transfer ports.

6. A fluid pressure control valve according to claim 5 wherein a second shuttle is interposed in the fluid circuit between said first-mentioned shuttle and said motor connections.

7. A fluid pressure control valve according to claim 6 wherein the selector drum has a separate set of control inlet and outlet ports for controlling the position of said second shuttle.

8. A control valve operated by means of fluid pressure to control the operation of fluid motors comprising a valve body, a selector element movable in said valve body to any one of a number of predetermined control positions depending on the required number of motor actions, a fluid pressure supply channel and a fluid exhaust channel connected to said valve body, a shuttle valve interposed between said supply channel and said exhaust channel and each of the fluid motors, a cylinder for each shuttle valve, each of said shuttle valves positioned by fluid pressure introduced into ports in said cylinder, said selector element having a patterned feed groove connected to said fluid pressure supply channel and exhaust ports communicating with said fluid exhaust channel whereby the fluid motors are operated in the order determined by said selector element.

9. The control valve of claim 8, further characterized by said selector element being a drum having control inlet and outlet ports opening through the cylindrical surface thereof and a control fluid track formed in the thickness of the cylindrical wall of the drum interconnecting all control ports of one kind.

References Cited in the file of this patent

UNITED STATES PATENTS 2,511,184 Walling ---------------- June 13, 1950